No. 627,323. Patented June 20, 1899.
L. A. CARON.
NUT LOCK.
(Application filed Nov. 14, 1898.)
(No Model.)
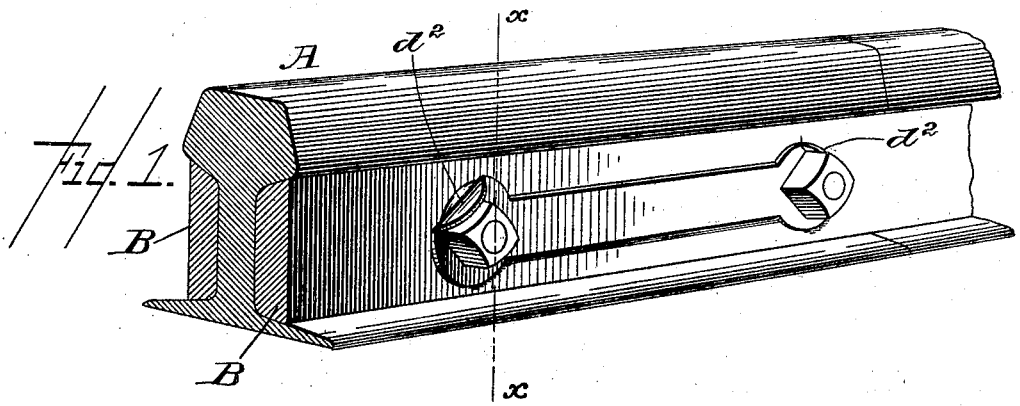
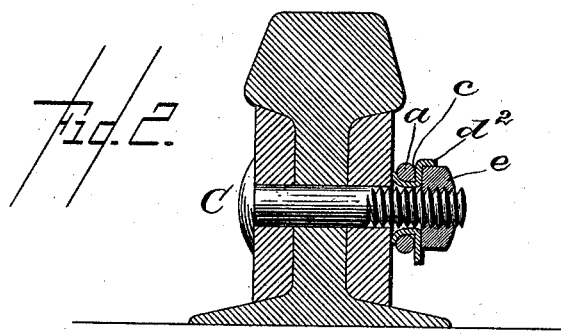
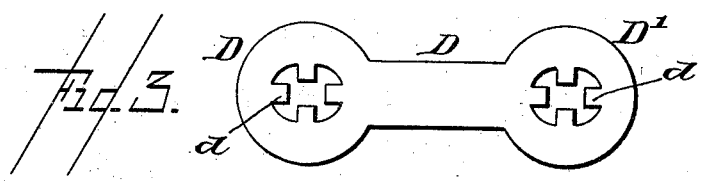
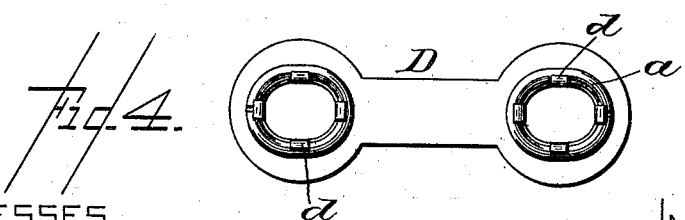
WITNESSES.
Charles F. Logan.
Thomas L. Drummond.
INVENTOR.
Louis A. Caron.
BY
ATTY'S.

UNITED STATES PATENT OFFICE.

LOUIS ALEXANDRE CARON, OF MONTREAL, CANADA, ASSIGNOR OF ONE-HALF TO UBALDE GARAND, OF SAME PLACE.

NUT-LOCK.

SPECIFICATION forming part of Letters Patent No. 627,323, dated June 20, 1899.

Application filed November 14, 1898. Serial No. 696,378. (No model.)

*To all whom it may concern:*

Be it known that I, LOUIS ALEXANDRE CARON, a subject of the Queen of Great Britain, residing at Montreal, Province of Quebec, Dominion of Canada, have invented an Improvement in Nut-Locks, of which the following description, in connection with the accompanying drawings, is a specification, like letters on the drawings representing like parts.

This invention has for its object the production of a novel nut-lock, one which may be readily and easily applied to a bolt inserted through a fish-plate, the nut-lock confining the nut in the position in which it may be left.

In accordance with my invention I provide a plate, preferably of sheet metal, it having near its ends openings provided with lips or projections which are turned outwardly and made to grasp and hold in position a ring-washer. These ring-washers having been applied to the plate and the plate applied to the bolt, the edge of the plate adjacent the squared side of a nut is readily bent over, thus forming a lip to coact with one of the flat sides of a nut.

Figure 1, in perspective, shows a rail with a nut-lock embodying my invention applied thereto. Fig. 2 is a section of the rail in the line $x$, Fig. 1. Fig. 3 shows a front side elevation of the plate composing the main body of the nut-lock, and Fig. 4 is a rear side elevation of said plate with its attached ring-washer.

A designates the rail, B the fish-plates, and C the usual bolts used to unite the fish-plates and rail.

The nut-lock is composed, essentially, of a plate D, shown as having enlarged and preferably circular ends D', said enlarged ends being punched through to leave openings with inturned lips or projections $d$, and, as shown in my present invention, there are four such lips at each end.

To complete this nut-lock, I take metal rings $a$, composed of wire, and lay them upon the rear side of the plate D, and then by a suitable instrument I force the projections $d$ through the opening of the plate and bend them outwardly about and so as to embrace the rings $a$ at intervals. These rings are preferably composed of round wire of considerable thickness, the thickness being preferably in excess of the thickness of the plate D, they being added to and made to form a part of the plate chiefly to enable the plate to be offset from the fish-plate, so that the edges of the enlarged portion D' of the plate D stand out in free space away from the fish-plate, so that they may be readily attached and bent over, as represented at $d^2$, Figs. 1 and 2, to act against a flat side of the nut $e$ and thereafter prevent the said nut from being turned on the bolt, it being supposed that the nut is turned fully onto the bolt before the edge $d^2$ is bent over to form the lip. It will be noticed in the drawings that the ends of the projections $d$ used to lock the ring $a$ in position with relation to the plate D partially embrace the ring, leaving the ends of said projections to be seated upon the fish-plate. By attaching these rings substantially circular in cross-section to the rear side of the plate D by means of the projections $d$, separated one from the other, the edge of the enlarged portions D' of the plate between the said projections may be more readily and easily turned than should I omit the projections $d$ and attempt to turn outwardly to one side of the plate a bur, as the hole to receive the bolt is made in the plate.

Should I depend upon a bur projecting from the plate to constitute a seat to bear against the fish-plate instead of the individual projections $d$ it will be obvious that the bur would have to be very short and that it could not be made evenly and that any washer held in place by such a bur would have to be very thin and lie so close to the fish-plate that there would not be sufficient space to manipulate readily and easily a cold-chisel or other device employed to bend over and form the lip $d^2$ to coact with the nut, and, further, the strain on the enlarged end in bending it over to form the lip would be apt to pull the burred edge into the washer.

In my invention the material between the projections when the lip $d^2$ is formed has opportunity to yield to a limited extent, thereby enabling the lip to be formed squarely and uniformly.

It is of great moment for the ready application of a nut-lock of the class herein described that the enlarged end of the plate used to connect adjacent bolts be positioned accurately at a considerable distance from the face of the fish-plate and that the said enlarged end project for a considerable distance beyond the ring-washer attached to said plate and surrounding the bolt, and it is also of importance that the washer be composed of wire substantially circular in cross-section or of such shape that the point of contact between the said washer where it lies against the rear side of the plate shall always leave an open V-shaped space in which may be readily inserted the edge of a cold-chisel.

As shown in Fig. 2, it will be noticed that there is a space $c$ between the rear side of the plate and the face of the washer next to it—a space large enough to readily receive the end of a cold-chisel.

If the washer were made absolutely flat and parallel with the plate at their point of contact, it would be much more difficult to enter the end of a cold-chisel properly into the space between the washer and the part of the plate to be overturned to constitute the lip $d^2$.

In my invention the ring itself does not contact with the fish-plate; but only the projections $d$, turned backwardly through the ring and embracing the same, contact with fish-plate.

My improved nut-lock is very simple in construction, and in practice it has been found exceedingly practical, it being readily applied, and when the nut is in position the edge of the enlarged portion may be readily turned over to coact with the head of the nut.

I do not claim a plate having a burred projection extended backwardly from its rear side to contact with the fish-plate.

Prior to my invention I am not aware that an independent ring has ever been applied to the rear side of the plate of a nut-lock and been there confined in position by means of projections from the nut-lock embracing the ring.

Having described my invention, what I claim, and desire to secure by Letters Patent, is—

1. A nut-lock composed of a plurality of ring-washers and a plate provided at its opposite end with bolt-holes, said plate presenting to said bolt-holes a series of separate projections concaved at their outer sides, said projections passing through the ring-washers and embracing the rear side thereof to thereby secure the said washers fixedly to the rear side of said plate, substantially as described.

2. A nut-lock composed of a metallic plate having enlarged ends provided with bolt-holes and presenting a series of projections, and ring-like washers composed of wire, said projections being outwardly turned from said plate and bent to partially embrace said ring-like washers, leaving the edges of the enlarged ends of said plate extended for a distance beyond the exterior of said washers, leaving open space between said washers and plate for the easy entrance of a tool by which to bend over a portion of said plate to make a lip, substantially as described.

In testimony whereof I have signed my name to this specification in the presence of two subscribing witnesses.

LOUIS ALEXANDRE CARON.

Witnesses:
ARTHUR PAYNOW,
G. A. BOURDON.